US010987687B2

(12) United States Patent
Tullney et al.

(10) Patent No.: US 10,987,687 B2
(45) Date of Patent: Apr. 27, 2021

(54) ADJUSTABLE HANDLE FOR A LIQUID APPLICATOR

(71) Applicant: Wagner Spray Tech Corporation, Plymouth, MN (US)

(72) Inventors: Heiko Tullney, Hamburg (DE); Katherine M. Scholz, Eagan, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 275 days.

(21) Appl. No.: 15/132,748

(22) Filed: Apr. 19, 2016

(65) Prior Publication Data

US 2016/0303596 A1     Oct. 20, 2016

Related U.S. Application Data

(60) Provisional application No. 62/150,024, filed on Apr. 20, 2015.

(51) Int. Cl.
*B05B 9/01* (2006.01)
*B05B 12/00* (2018.01)
(Continued)

(52) U.S. Cl.
CPC ............ *B05B 9/01* (2013.01); *B05B 12/0022* (2018.08); *B05B 12/0026* (2018.08);
(Continued)

(58) Field of Classification Search
CPC ....... B05B 9/01; B05B 12/002; B05B 15/061; B05B 15/63; F16K 3/246; Y10T 16/476;
(Continued)

(56) References Cited

U.S. PATENT DOCUMENTS 2,820,670 A * 1/1958 Charlop .................. B05B 7/206
239/85
3,181,798 A * 5/1965 Williams ................ B05B 1/042
239/499
(Continued)

FOREIGN PATENT DOCUMENTS

| CN | 102186597 A | 9/2011 |
| CN | 202292679 U | 7/2012 |
| EP | 2191905 A1 | 6/2010 |

OTHER PUBLICATIONS

International Search Report and Opinion for PCT/US2016/028256, dated Jun. 30, 2016, Filed Apr. 19, 2016. 8 pages.
(Continued)

*Primary Examiner* — Qingzhang Zhou
*Assistant Examiner* — Christopher R Dandridge
(74) *Attorney, Agent, or Firm* — Christopher R. Christenson; Kelly, Holt & Christenson, PLLC

(57) ABSTRACT

An applicator is presented. The applicator comprises a fluidic channel extending from a fluid inlet to a fluid outlet. The applicator also comprises a trigger. The trigger is configured to, when actuated, allow fluid to flow through the fluidic channel. The applicator also comprises an adjustable handle with a frame. The handle comprises a finger rest on a first side of the frame. The handle also comprises a grip on a second side of the frame. The second side is opposite the first side. The grip is coupled to the frame by an adjustment mechanism that, when actuated, is configured to change a distance between the finger rest and the grip.

16 Claims, 11 Drawing Sheets

(51) Int. Cl.
*F16K 3/24* (2006.01)
*B05B 15/62* (2018.01)
*B05B 15/63* (2018.01)

(52) U.S. Cl.
CPC .............. *B05B 15/62* (2018.02); *B05B 15/63* (2018.02); *F16K 3/246* (2013.01)

(58) Field of Classification Search
CPC ..... Y10T 16/498; Y10T 16/44; Y10T 16/466; Y10T 16/469; Y10T 16/48; Y10T 74/20828; Y10S 16/12; B25G 1/102; B25G 1/00; B25G 1/10; B62K 21/16
USPC .................................... 239/526; 16/412, 430
See application file for complete search history.

(56) References Cited

U.S. PATENT DOCUMENTS

| | | | | |
|---|---|---|---|---|
| 3,840,184 | A * | 10/1974 | Spivey | ................... B05B 7/066 239/415 |
| 3,920,188 | A * | 11/1975 | Price | ......................... B05B 7/12 239/403 |
| 5,330,108 | A | 7/1994 | Grime et al. | |
| 5,695,231 | A * | 12/1997 | Hoffman | ................ A01B 1/026 16/426 |
| 5,833,145 | A | 11/1998 | Smith | |
| 6,264,637 | B1 * | 7/2001 | Hogan | ................... A01K 11/00 604/191 |
| 6,427,981 | B1 | 8/2002 | Guo | |
| 6,698,671 | B1 | 3/2004 | Chen | |
| 2004/0088827 | A1 * | 5/2004 | Tillim | ...................... B60T 7/08 16/430 |
| 2004/0217205 | A1 | 11/2004 | Kohs et al. | |
| 2013/0015266 | A1 | 1/2013 | Riley et al. | |
| 2014/0346257 | A1 * | 11/2014 | Reetz, III | ............ B05B 12/0026 239/526 |

OTHER PUBLICATIONS

International Preliminary Report on Patentability for International Patent Application No. PCT/US2016/028256, dated Oct. 24, 2017, 7 pages.
Extended European Search Report for European Patent Application No. 16783679.0 dated Aug. 1, 2018, 8 pages.
First Office Action for Chinese Patent Application No. 201680022924.9 dated Mar. 30, 2020, 22 pages with English Translation.
Second Office Action for Chinese Patent Application No. 201680022924.9 dated Oct. 27, 2020, 9 pages with English Translation.

* cited by examiner

ADJUSTABLE HANDLE FOR A LIQUID APPLICATOR

CROSS-REFERENCE TO RELATED APPLICATIONS

The present application is based on and claims the benefit of U.S. Provisional Patent Application Ser. No. 62/150,024 filed Apr. 20, 2015, the content of which is hereby incorporated by reference in its entirety.

BACKGROUND

A liquid dispensing system may be used to atomize and apply a fluid, for example, retrieved from a storage unit, and applied on a desired surface. Liquid dispensing systems often include an applicator configured to apply the desired fluid, e.g. paint, to a surface. In using a paint applicator, for example, an operator may apply pressure to a trigger in order to actuate a pressurized flow of paint. However, the user's hand may experience tension or irritation during an application process.

A user may experience fatigue in their hands and arms when using a paint applicator for extended periods of time. This fatigue can lead to an inconsistent coat of paint applied paint to a surface.

SUMMARY

An applicator is presented. The applicator comprises a fluidic channel extending from a fluid inlet to a fluid outlet. The applicator also comprises a trigger. The trigger is configured to, when actuated, allow fluid to flow through the fluidic channel. The applicator also comprises an adjustable handle with a frame. The handle comprises a finger rest on a first side of the frame. The handle also comprises a grip on a second side of the frame. The second side is opposite the first side. The grip is coupled to the frame by an adjustment mechanism that, when actuated, is configured to change a distance between the finger rest and the grip.

DETAILED DESCRIPTION OF ILLUSTRATIVE EMBODIMENTS

A user of a liquid applicator may experience fatigue during a spraying application. Fatigue can lead to inconsistencies in a liquid application, for example, streaking in a coat of paint. Therefore, an applicator is desired that may alleviate, or reduce, tension or irritation experienced during an application, specifically in hands and/or arms.

A more uniform coat of paint may be achieved, for example, when the paint is steadily applied, which is difficult when a user experiences fatigue. Fatigue may comprise hand or arm soreness, aching or weakness, any of which may cause inconsistency in a fluid application. A user may find that having to grip a handle over extended periods of time may cause fatigue in their hand or arm. When fatigue is experienced, a user may actuate one or more adjustment mechanisms, for example by increasing a distance between a grip and a frame. The increased distance may reduce fatigue experienced by a user.

In one embodiment, an applicator with an adjustable handle may alleviate some tension experienced during a job, specifically while the user is applying tension to a trigger of the applicator. For example, a user may need to provide consistent and sufficient pressure actuate an applicator trigger during a spraying application. At least some embodiments herein illustrate mechanisms for relieving tension or irritation experienced by a user during use of a liquid applicator, for example during a paint spraying operation. Alleviating experienced tension may decrease user fatigue and extend the time the user can use the applicator before irritation or tension is experienced.

Figure 1:
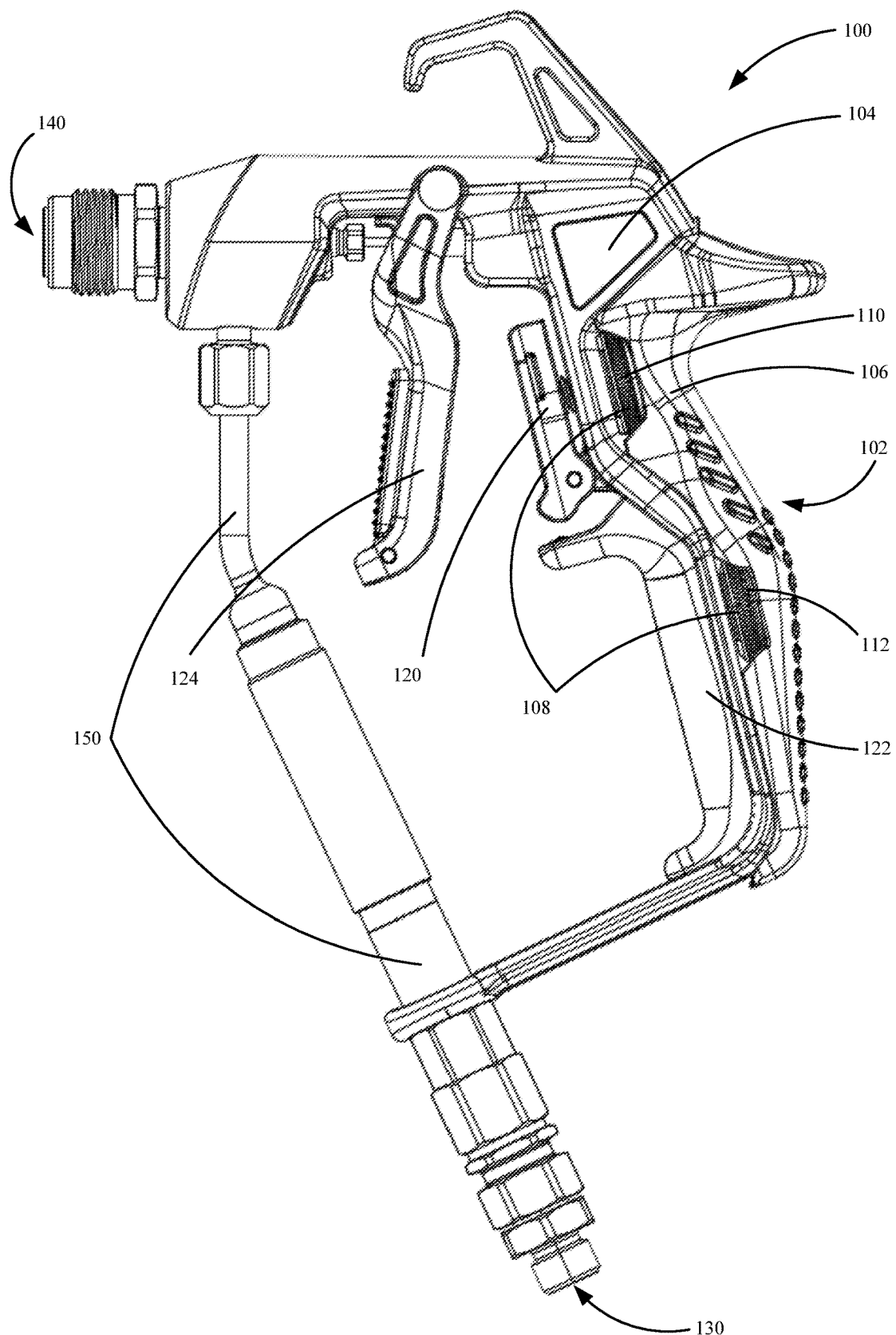
FIG. 1 illustrates an example of a liquid applicator with an adjustable handle in accordance with one embodiment of the present invention.

FIG. 1 illustrates an example of a liquid applicator with an adjustable handle in accordance with one embodiment of the present invention. While embodiments of applicators described herein are described with respect to the dispersal of fluids, specifically liquid fluids such as paint or other coating material, it is envisioned that at least some embodiments herein may be useful in accordance with applicators configured to apply other material, for example textured material, plural components, etc.

Paint applicator 100, in one embodiment, comprises a handle 102. A user may contact handle 102 when applying pressure, or otherwise actuating a trigger 124. In one embodiment, while some of a user's fingers are in contact with trigger 124, other fingers may contact a finger rest 122. Applicator 100, in one embodiment, comprises a frame 104. Frame 104 is configured, in one embodiment, to couple to each of a grip 106, trigger lock 120, and finger rest 122. In one embodiment, finger rest 122, and trigger lock 120, are on a first side of frame 104, opposite grip 106, on a second side of frame 104. In one embodiment, trigger lock 120 is configured to rotate and contact trigger 124, holding trigger 124 in a non-actuated position.

In one embodiment, fluid flows into applicator 100 through a fluid inlet 130, for example, coupled to a fluid source, along a fluid path 150 through the applicator, exiting fluid outlet 140, for example where it is dispersed in a desired spray pattern. In one embodiment, when a fluid outlet 140 is fully open, trigger 124 contacts trigger lock 120. In one embodiment, trigger 124 is configured to fit over trigger lock 120, contacting frame 104.

In one embodiment, applicator 100 may comprise one or more adjustment mechanisms 108 configured to provide an adjustable distance between grip 106 and frame 104. In one embodiment, actuating adjustment mechanisms 108 causes grip 106 to physically move, for example, in a direction away from frame 104, in one embodiment. The direction, in one embodiment, comprises strictly linear motion. In another embodiment, the direction comprises some rotational movement of grip 106 with respect to frame 104. However, in another embodiment, frame 104 may physical move in response to actuation of adjustment mechanisms 108. In one embodiment, adjustment mechanism 108, when actuated, causes finger rest 122 to physically move. In one embodiment, actuation of adjustment mechanism 108 causes trigger lock 120 to physically move.

In one embodiment, frame 104 and grip 106 are coupled by a first adjustment mechanism 110 and a second adjustment mechanism 112. In one embodiment, multiple adjustment mechanisms 108 provide additional customization for a user in order to find the most comfortable grip based on a user's hand size, or to adjust a grip to relieve experienced tension. However, in another embodiment, only a single adjustment mechanism 108 is present on a spray applicator. In a further embodiment, more than two adjustment mechanisms 108, for example three or four adjustment mechanisms are included in applicator handle 102. In one embodiment, first adjustment mechanism 110 is configured to change a distance between grip 106 and trigger lock 120.

Figure 2A:
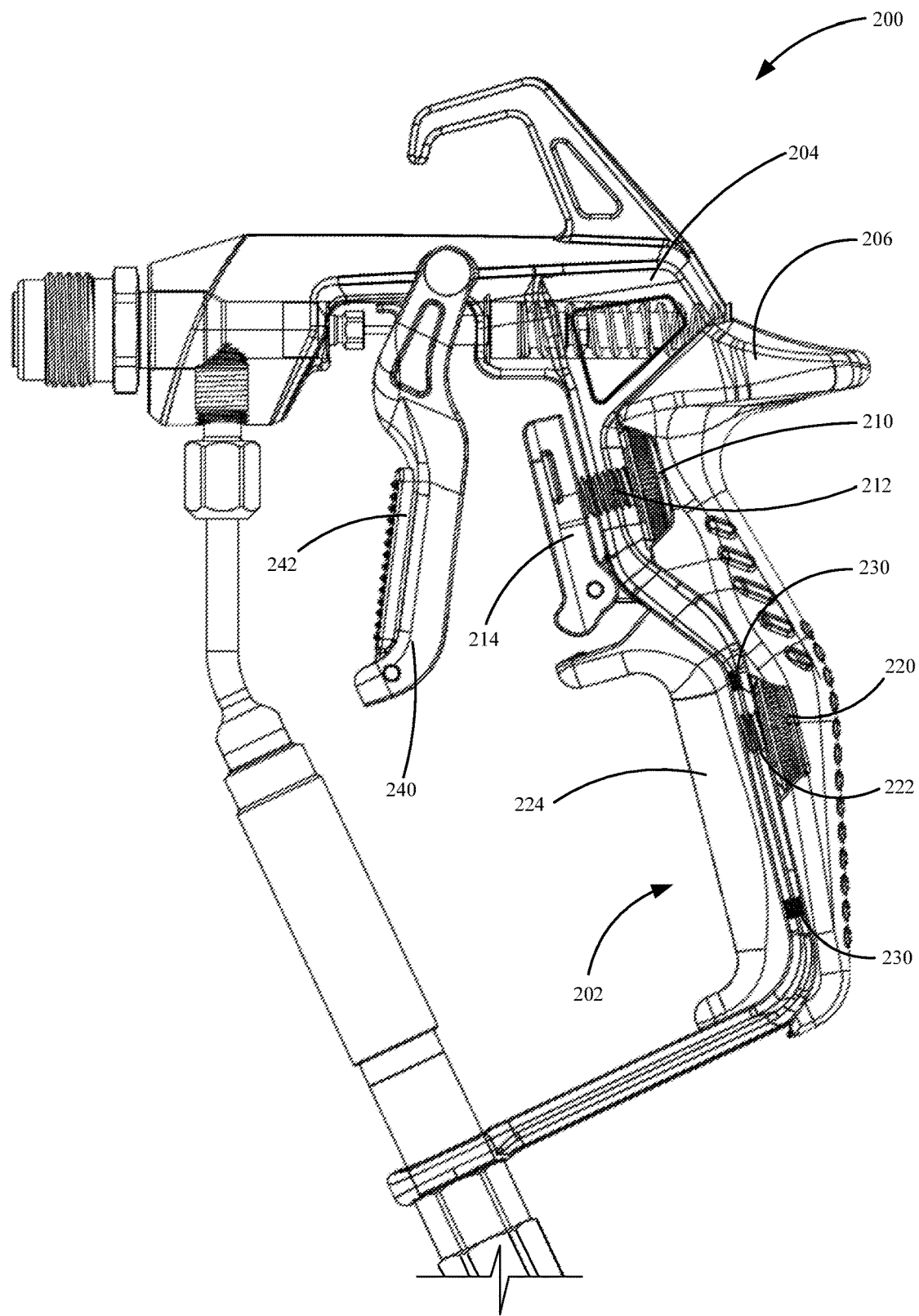
FIGS. 2A-2C illustrate a plurality of views of an adjustable handle in accordance with one embodiment of the present invention.
Figure 2B:
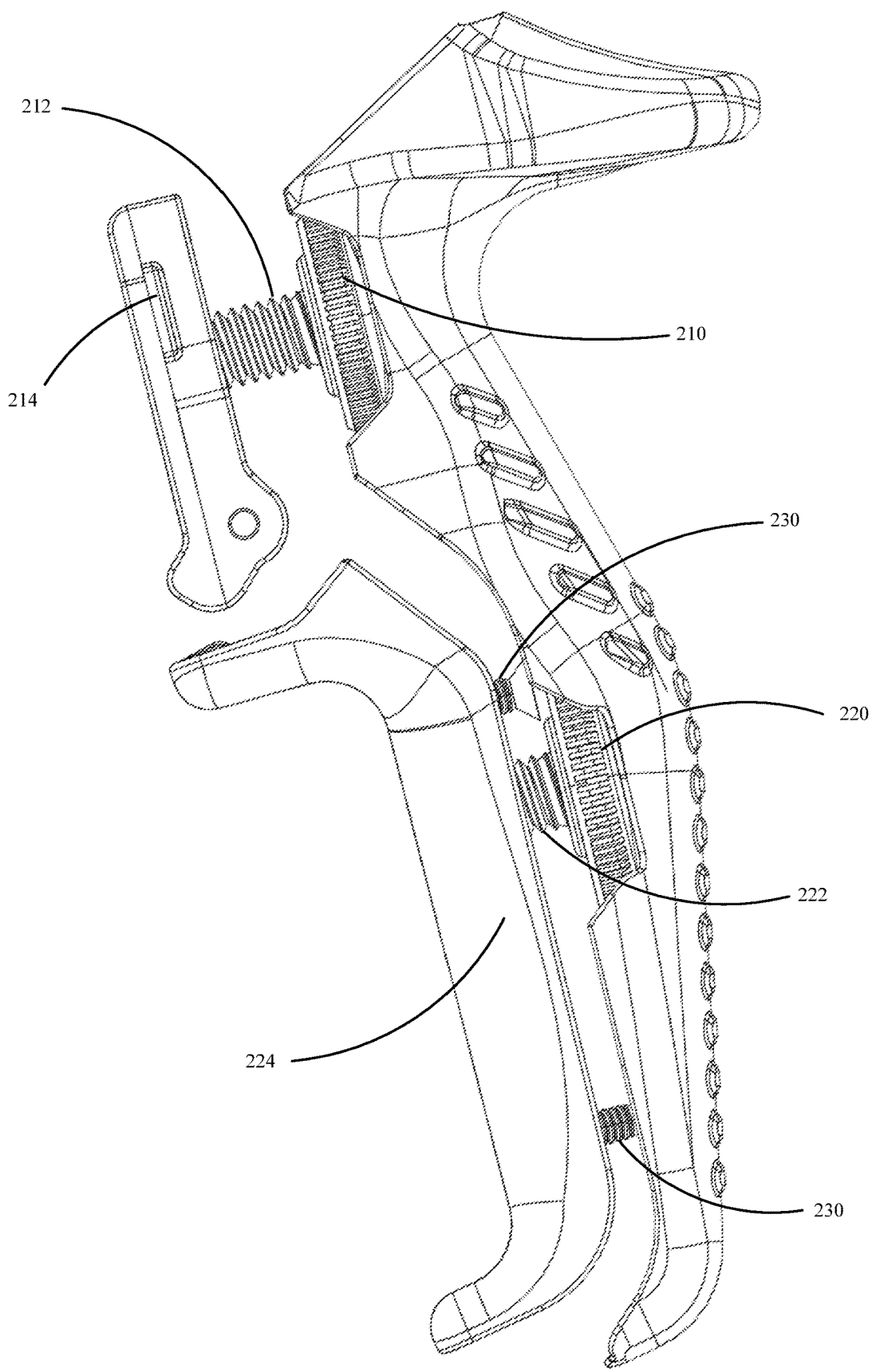
Figure 2C:
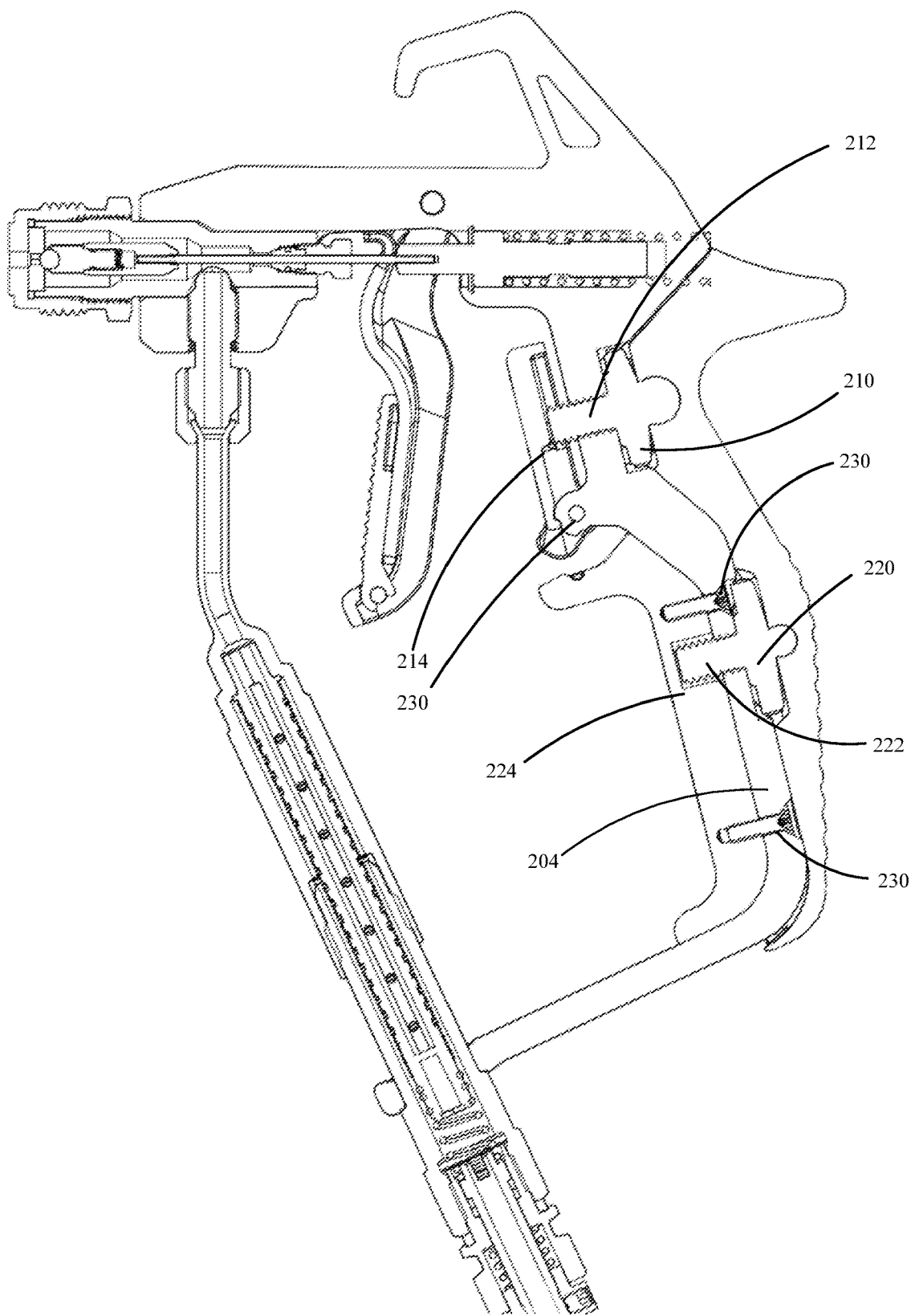

FIGS. 2A-2C illustrate various views of an adjustable handle in accordance with one embodiment of the present invention. FIG. 2A illustrates a view of an applicator 200, with frame 204 illustrated in phantom, to better illustrate adjustment mechanisms 210 and 220. In one embodiment, applicator 200 comprises a handle 202 coupled to a frame 204. In one embodiment, frame 204 is coupled to an adjustable grip 206, a finger rest 224, and a trigger lock 214.

In one embodiment, adjustable grip 206 is coupled to a first adjustment mechanism 210 with a first connector 212. In one embodiment, adjustable grip 206 also comprises a second adjustment mechanism 220 coupled to a second connector 222. In one embodiment, connectors 212 and 222 are moveable within handle 202 and are configured to change a distance between the adjustable grip 206 and frame 204, when actuated.

In one embodiment, adjustment mechanisms 210 and 220 are coupled, such that actuation of adjustment mechanism 210 causes simultaneous actuation of adjustment mechanism 220. In another embodiment, adjustable mechanism 210 and 220 are not coupled, such that a user can customize a distance between frame 204 and grip 206, a distance between frame 204 and trigger lock 214, using either of adjustable mechanism 210 and 220. In one embodiment, connectors 212 and 222 comprise threaded screws configured to engage with, and be received by, internal corresponding threads within handle 202 and/or its components. In one embodiment, adjustable mechanisms 210 and 220 comprise rotating members with a series of stops, or positions, corresponding, for example, to different distances between frame 204 and grip 206. In one embodiment, in addition to couplings through connectors 212 and 222, frame 204 and adjustable grip 206 are also coupled, in one embodiment, by connection points 230.

In one embodiment, applicator 200 comprises a trigger 240 with a trigger grip 242. In one embodiment, when an outlet of applicator 200 is fully open, trigger 240 is substantially in contact with trigger lock 214. In one embodiment, trigger grip 242 is configured to at least partially alleviate some tension experienced by actuation of trigger 240.

In one embodiment, actuation of adjustment mechanisms 210 and 220 comprises rotation, for example clockwise or counterclockwise to either increase or decrease an axial distance between frame 204 and one or more of grip 206, trigger lock 214, and finger rest 224. In another embodiment, actuation of adjustment mechanisms 210 and 220 comprises pushing, for example a button, or activating a switch. In one embodiment, adjustment mechanisms 210 and 220 automatically move between a series of potential adjustment positions when actuated. However, other appropriate actuation mechanisms are also envisioned herein.

FIG. 2B illustrates a close-up view of adjustment mechanisms 210 and 220, with frame 204 removed for illustration purposes. In one embodiment, adjustment mechanisms 210 and 220 are configured to allow for at least some separation between finger rest 224 and adjustable grip 206, even in a closest position, for example at least a distance equal to a frame width. In one embodiment, finger rest 224 and adjustable grip 206 are on opposing sides of frame 204, shown in FIG. 2A.

FIG. 2C illustrates a cross sectional view of applicator 200. In one embodiment, for example that shown in FIG. 2C, finger rest 224 and adjustable grip 206 are coupled by second adjustment mechanism 220, which may extend substantially through a portion of frame 204. Finger rest 224 and adjustable grip 206 may also be coupled, as shown in FIG. 3 by one or more connection mechanisms 230. Connection mechanisms 230 may extend, in one embodiment, substantially through a portion of frame 204. In another embodiment, a pair of connection mechanisms 230 are used, wherein each couples frame 204 to either of adjustable grip 206 or finger rest 224. In one embodiment, one of connection mechanism 230 may extend at least partially into adjustable grip 206. In one embodiment, one of connection mechanisms 230 may extend at least partially into finger rest 224. In one embodiment, one of connection mechanisms 230 may extend at least partially into trigger lock 240.

In one embodiment, trigger lock 214 is coupled to adjustable grip 206, for example by first adjustment mechanism 210 which, in one embodiment, extends substantially through a portion of frame 204. In one embodiment, trigger lock 214 is also coupled to adjustable grip 206 by one or more connectors 230, for example, through frame 204. In one embodiment, for example that shown in FIG. 2C, connector 230 only couples trigger lock 214 to frame 204. In another embodiment, connector 230 substantially extends through frame 204 such that it directly couples adjustable grip 206 to trigger lock 214.

In one embodiment, adjustment mechanisms 210 and 220 comprise a spherical protrusion configured to fit within a corresponding socket of removable grip 206. Adjustment mechanisms, in conjunction with removeable grip 206 may form a ball and socket configuration, for example as shown in FIG. 2C. In one embodiment, removal of a grip 206 may be advantageous to allow for cleaning of the frame and grip. In one embodiment, multiple grips 206 of different sizes may be provided to a potential user, such that users of different hand sizes have different sized grips available for use.

Figure 3A:
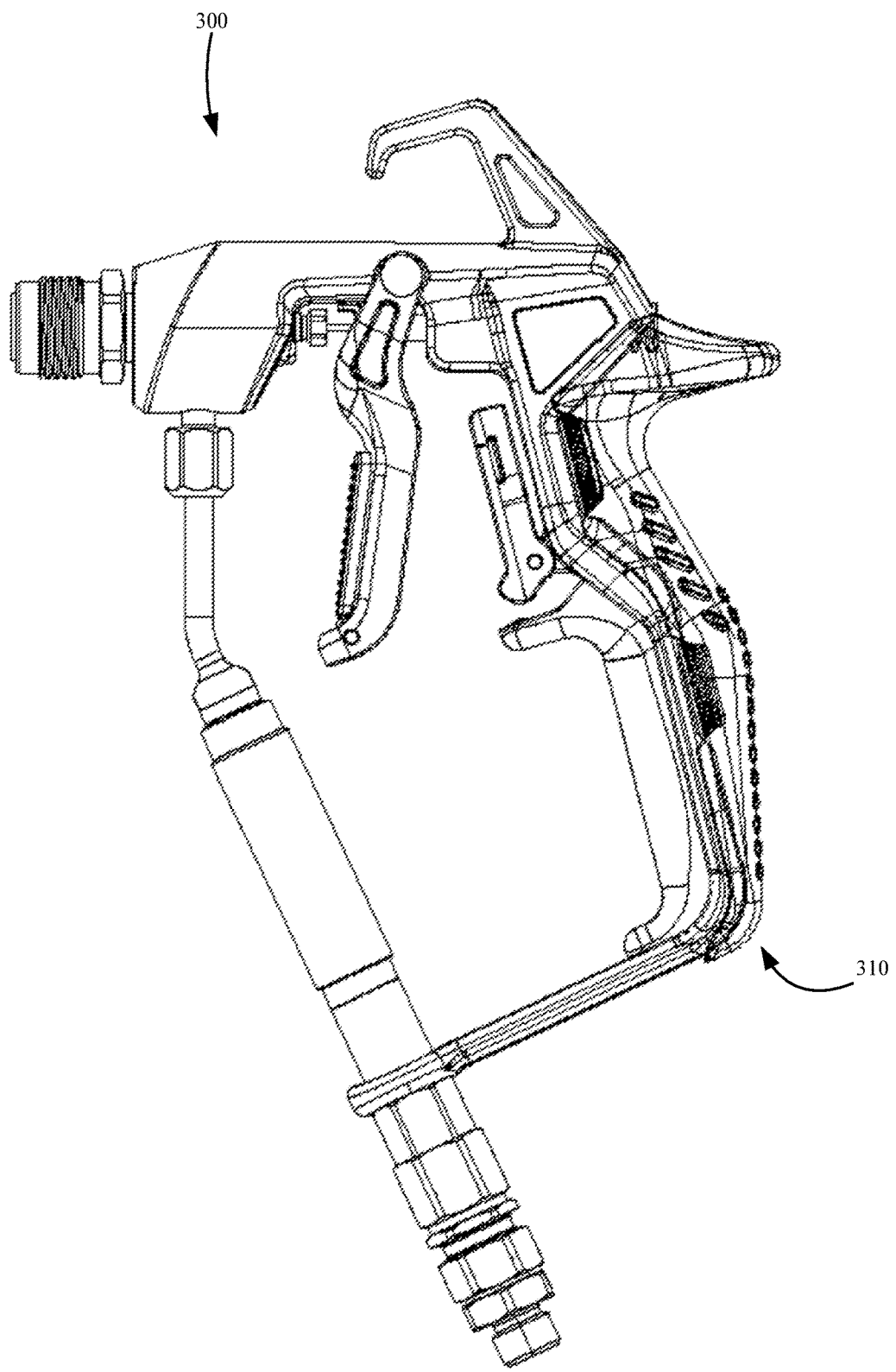
FIGS. 3A-3C illustrate an adjustable handle transitioning between adjustment positions in accordance with one embodiment of the present invention.
Figure 3B:
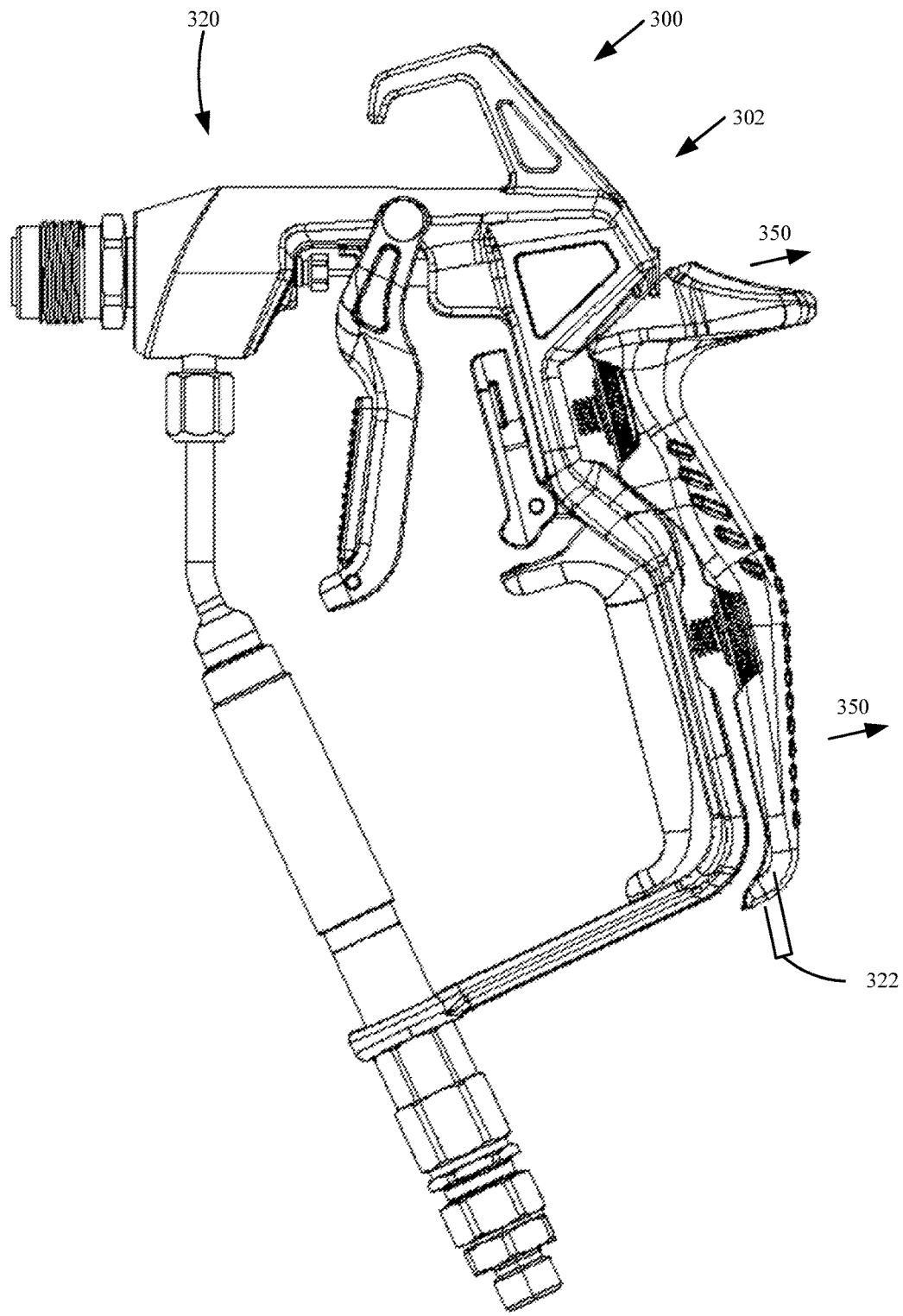
Figure 3C:
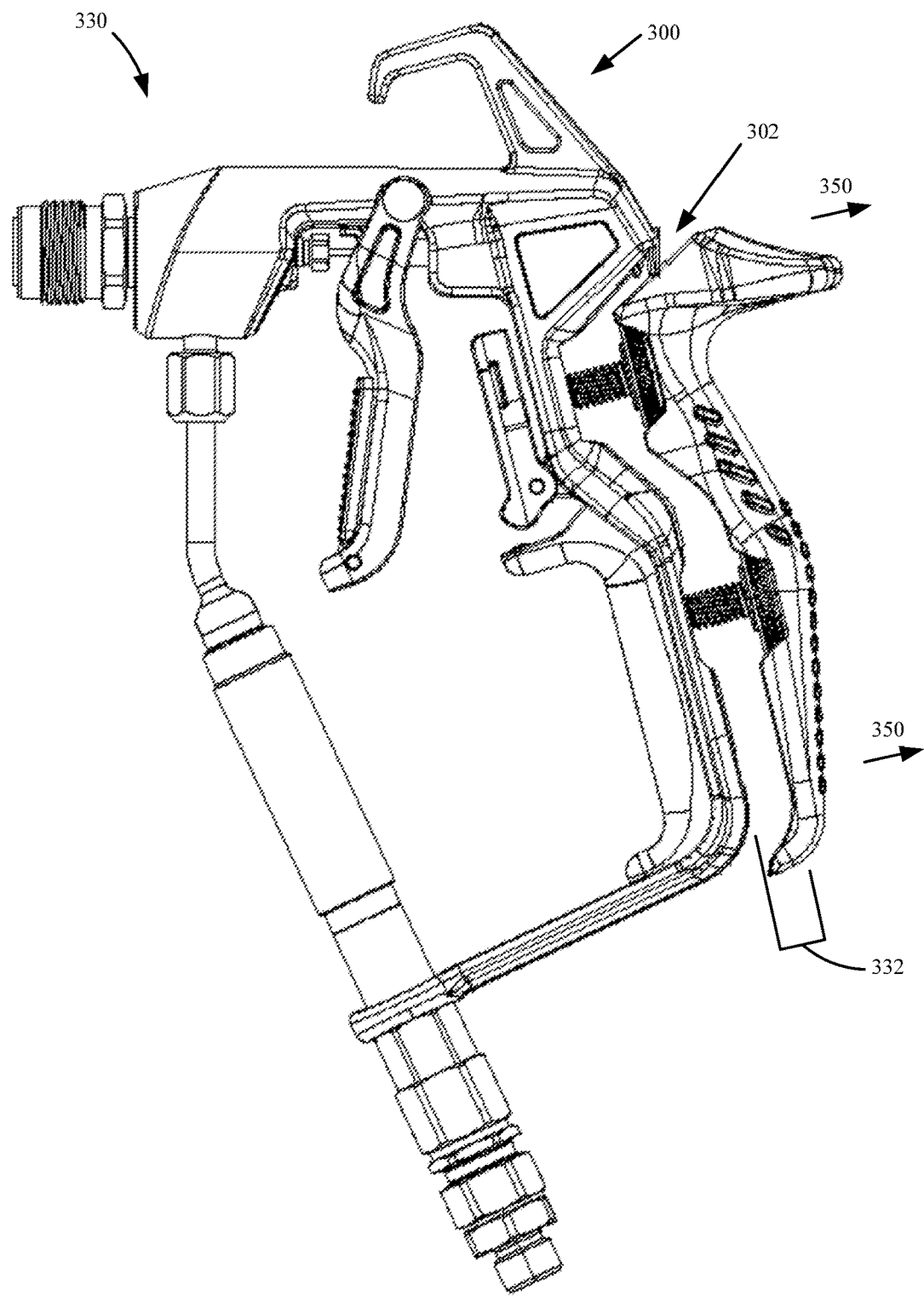

FIGS. 3A-3C illustrate an adjustable handle transitioning between adjustment positions in accordance with one embodiment of the present invention. FIG. 3A illustrates an applicator 300, with an adjustable handle 302 in a closed position 310. In one embodiment, a closed position 310 comprises an applicator frame substantially in contact with an adjustable grip, on a first side, and a trigger lock, on a second side. In one embodiment, closed position 310 comprises a frame substantially in contact with an adjustable grip on a first side, and a finger rest on an opposing side. In another embodiment, closed position 310 comprises the frame positioned proximate to, but not contacting, at least one of trigger lock, finger rest, and/or adjustable grip.

FIG. 3B illustrates an applicator in a transitional position 320 representing, for example, one of many different potential adjustment positions between closed position 310 and open position 330. In one embodiment, transitional position 320 comprises a transition gap 322 between a frame and adjustable grip of a handle 302. In another embodiment, either the adjustable grip or frame of applicator 300 comprise an expandable material, such that transition gap 322 is shown only for illustrative purposes. In another embodiment, handle 302 comprises one or more hard materials, for example metal, plastic or another suitable, substantially nonexpendable material. In one embodiment, transition gap 322 comprises a distance between the frame and a finger rest, or between a frame and trigger lock. In one embodiment, a magnitude of the transition gap between the frame and finger rest differs from a magnitude of the transition gap between the frame and the trigger lock, for example adjustable by different adjustment mechanisms along the frame.

In one embodiment, transition gap 322 is formed by manipulating one or more adjustment mechanisms located along a frame of handle 302, for example adjustment mechanisms configured to adjust a position of a finger rest and/or a trigger lock and/or an adjustable grip with respect to the frame. In one embodiment, as the applicator handle transitions between a closed position and an open position, handle 302 moves in the direction indicated by arrow 350. In one embodiment, as indicated in FIG. 3B, the movement of the adjustable grip along direction 350 is strictly linear. In another embodiment, the movement of adjustable grip comprises at least partial rotation with respect to the handle frame. In one embodiment, between a closed position 310 and an open position 330, an adjustable handle may go through a continuum of transitional positions, one of which, transitional position 320, is shown for illustrative purposes only in FIG. 3B. In one embodiment, adjustable handle 302 goes through distinct transitional positions, including but not limited to transitional position 320, between an open position 330 and a closed position 310, wherein each position is defined by a stop. In one embodiment, transition position 320 comprises the frame positioned proximate to, but not contacting, at least one of trigger lock, finger rest, and/or adjustable grip.

FIG. 3C illustrates an open position 330 of an adjustable handle 302. In one embodiment, an open position is defined by an open gap 332 between an adjustable grip and a frame of adjustable handle 302. In one embodiment, open gap 332 comprises a substantially constant distance along a length of handle 302. However, in another embodiment, a width of gap 332 differs along a length of adjustable handle 302.

In at least one embodiment, adjustment mechanisms are configured to allow for the adjustable grip, finger rest, and/or trigger lock to completely separate from an applicator frame. Complete removal may be advantageous, for example, to assist in cleaning or replacement of components.

Figure 4:
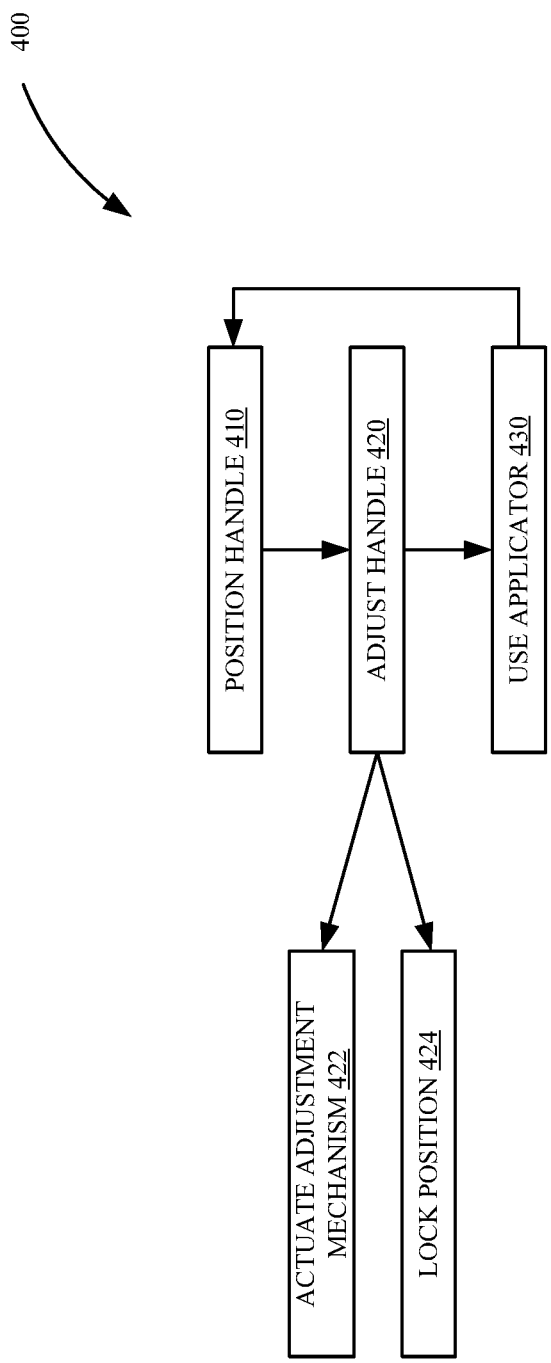
FIG. 4 illustrates a flow diagram of a method for adjusting a handle of an applicator in accordance with one embodiment of the present invention.

FIG. 4 illustrates a flow diagram of a method for adjusting a handle of an applicator in accordance with one embodiment of the present invention. Method 400 may allow a user of an applicator to adjust a grip of an adjustable handle before, or during, a given job.

In block 410, in one embodiment, a user positions an adjustable handle of an applicator. In one embodiment, positioning comprises moving the handle such that one or more adjustment mechanisms are available for actuation. In one embodiment, adjustment mechanisms are configured to be covered during a spraying application, in order to protect the adjustment mechanisms, and internal components, from contamination by elements or a liquid being applied by the applicator. In such an embodiment, positioning a handle comprises exposing adjustment mechanisms for actuation, for example by removing a protective cover. In one embodiment, positioning comprises releasing applied pressure to an applicator trigger, as it may be desireable for adjustments to be made only when the applicator is not actively applying fluid.

In block 420, in one embodiment, a user actuates an adjustment mechanism of a handle, causing a distance between a frame and a handle component to change, for example a grip, a finger rest, and/or a trigger lock. In one embodiment, adjusting a handle comprises a user adjusting one or more adjustment mechanisms located along a length of the handle. For example, as illustrated in FIGS. 1-3, a handle may have a first adjustment mechanism configured to adjust a distance between a grip and a trigger lock, and a second adjustment mechanism configured to adjust a distance between the grip and a finger rest. In one embodiment, the applicator may have three adjustment mechanisms, or four adjustment mechanisms, or more than four adjustment mechanisms.

In one embodiment, adjusting the handle comprises actuating each adjustment mechanism individually. In another embodiment, actuating the handle comprises adjusting one adjustment mechanism, which may cause one or more other adjustment mechanisms to simultaneously actuate. In one embodiment, simultaneous actuation comprises at least two adjustment mechanisms adjusting at the same rate. In another embodiment, simultaneous actuation comprises adjustment mechanisms adjusting at a proportional rate, for example increasing axial distances at a 1:2 ration, a 1:3 ratio, etc.

In one embodiment, adjusting a handle as indicated in block 420, may comprise locking the adjustment mechanism such that the grip maintains a desired circumference until a subsequent adjustment, as indicated in block 424.

In one embodiment, adjusting a handle comprises actuating an adjustment mechanism, as indicated in block 422. One or more adjustment mechanisms may be configured to freely rotate, such that, as pressure is applied, for example by a user squeezing the handle, the handle will slowly return to a closed position unless a lock is applied. In one embodiment, a lock must be applied to each adjustment mechanism. In another embodiment, a lock is only applied to one adjustment mechanism, which maintains the position of all adjustment mechanisms. In one embodiment, a lock component comprises a physical component configured to prevent unwanted movement of the adjustment mechanism. In one embodiment, the adjustment mechanism is substantially locked in place by friction forces, such that normal user grip pressure is not sufficient to cause the adjustment mechanism to actuate. In another embodiment, the lock comprises a physical stop configured to prevent unwanted actuation by the adjustment mechanism.

In one embodiment, actuating an adjustment mechanism, in block 422, comprises causing an adjustment mechanism to move through a series of discrete positions, each corresponding to a different circumference of the grip, until a desired circumference is achieved. In another embodiment, actuating an adjustment mechanism comprises moving the adjustment mechanism along a continuum of grip circumferences, from a minimum distance, corresponding to the grip substantially in contact with the frame, to a maximum distance, corresponding to a maximum actuation of the adjustment mechanism. In one embodiment, maximum actuation corresponds to complete separation of the grip from the frame of the applicator.

In one embodiment, actuating an adjustment mechanism, as indicated in block 422, comprises rotation. In one embodiment, an adjustment mechanism comprises a threaded screw configured to engage with internal threads within the handle, e.g. within the frame, grip, finger rest and/or trigger lock. In one embodiment, rotation of the screw causes a grip to physically move away from a frame of a handle, in a direction substantially perpendicular to a length of the frame. Rotation may comprise, in one embodiment, rotating a screw in a clockwise direction. In another embodiment, rotation comprises rotating the screw in a counterclockwise direction.

In one embodiment, actuation causes the grip to physically move, in a direction away from a frame. In another embodiment, actuating comprises a frame physically moving, in a direction away from the grip. In one embodiment, the movement direction is perpendicular to, or substantially perpendicular to, a length of the frame. In one embodiment rotation causes the grip to move away from the frame, in a strictly linear direction. In another embodiment, the movement of adjustable grip comprises at least partial rotation with respect to the frame. While an embodiment is presented in FIGS. 1-3 illustrating a screw-based adjustment mechanism, other suitable configurations are also envisioned. In one embodiment, the adjustment mechanism is at least partially automated, such that actuation comprises activating a motor driven adjustment mechanism, for example, activated by pressing a button or throwing a switch. In another embodiment, the adjustment mechanisms are fully manual.

In one embodiment, actuating an adjustment mechanism comprises adjusting a circumference of the handle with respect to the finger rest. In one embodiment, actuating an adjustment mechanism comprises adjusting a circumference of the handle with respect to the trigger lock. In one embodiment, actuating an adjustment mechanism comprises adjusting a circumference of the handle along a full length of the handle.

In one embodiment, as indicated in block 430, a user may use an applicator with adjustable handle as desired during an application. However, as an application process proceeds, a user may continue to, or newly experience, irritation or tension in a hand. When tension is experienced, method 400 may repeat and the user may readjust a handle until a desired circumference is achieved. Additionally, method 400, or a similar method, may be useful at the end of an application to return the applicator handle to an original circumference.

Figure 5A:
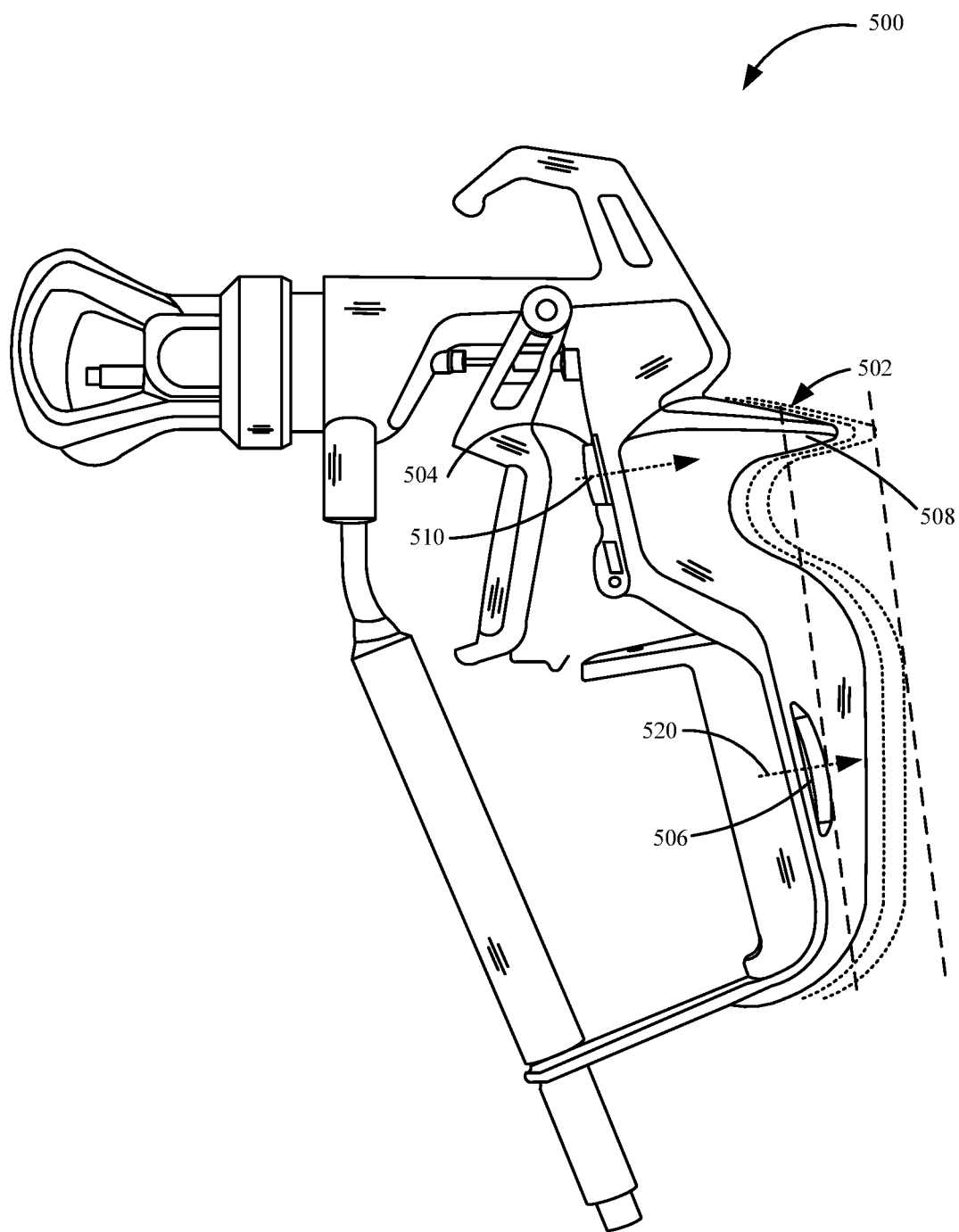
FIGS. 5A-5C illustrate a plurality of adjustment configurations of an adjustable handle in accordance with one embodiment of the present invention.
Figure 5B:
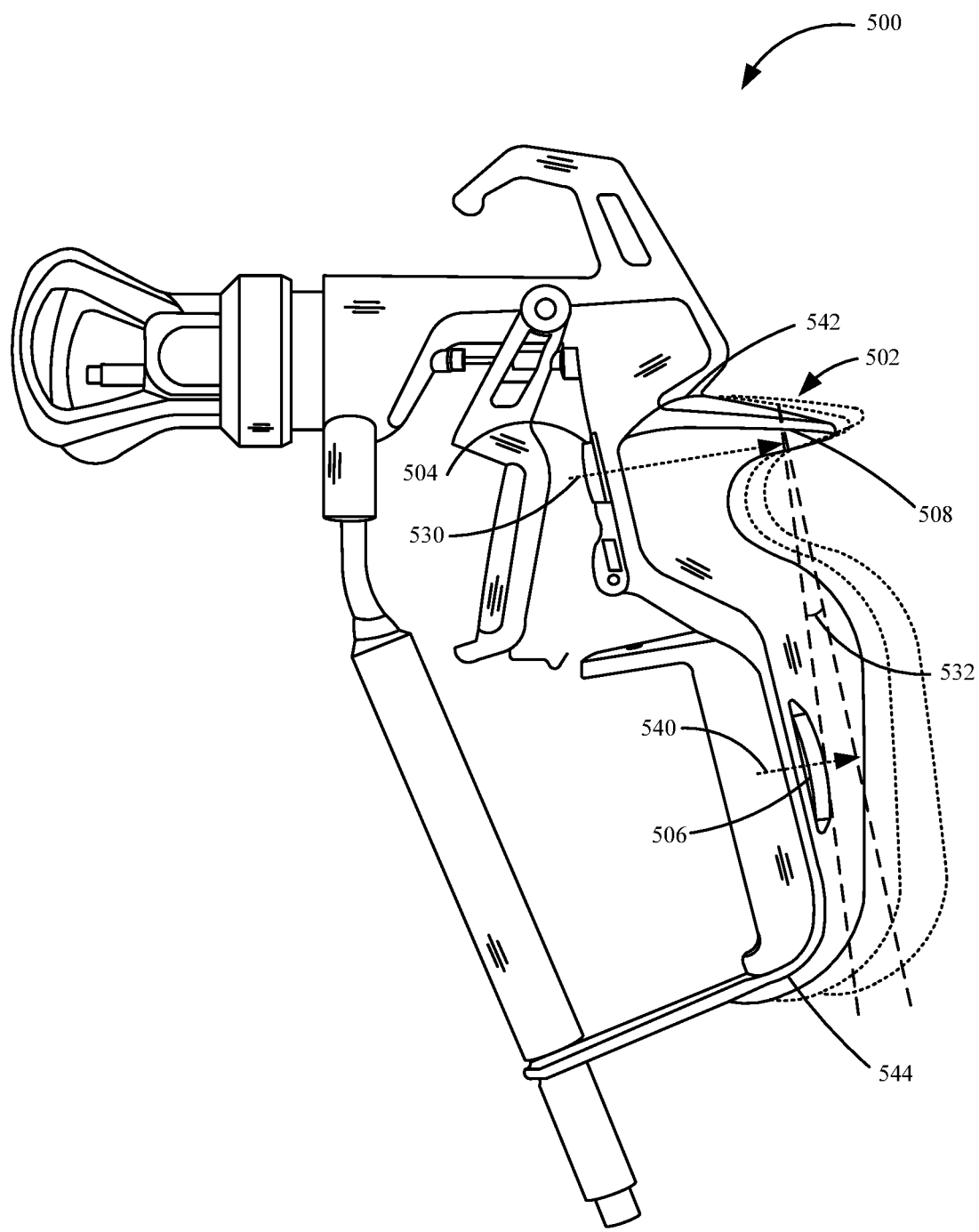
Figure 5C:
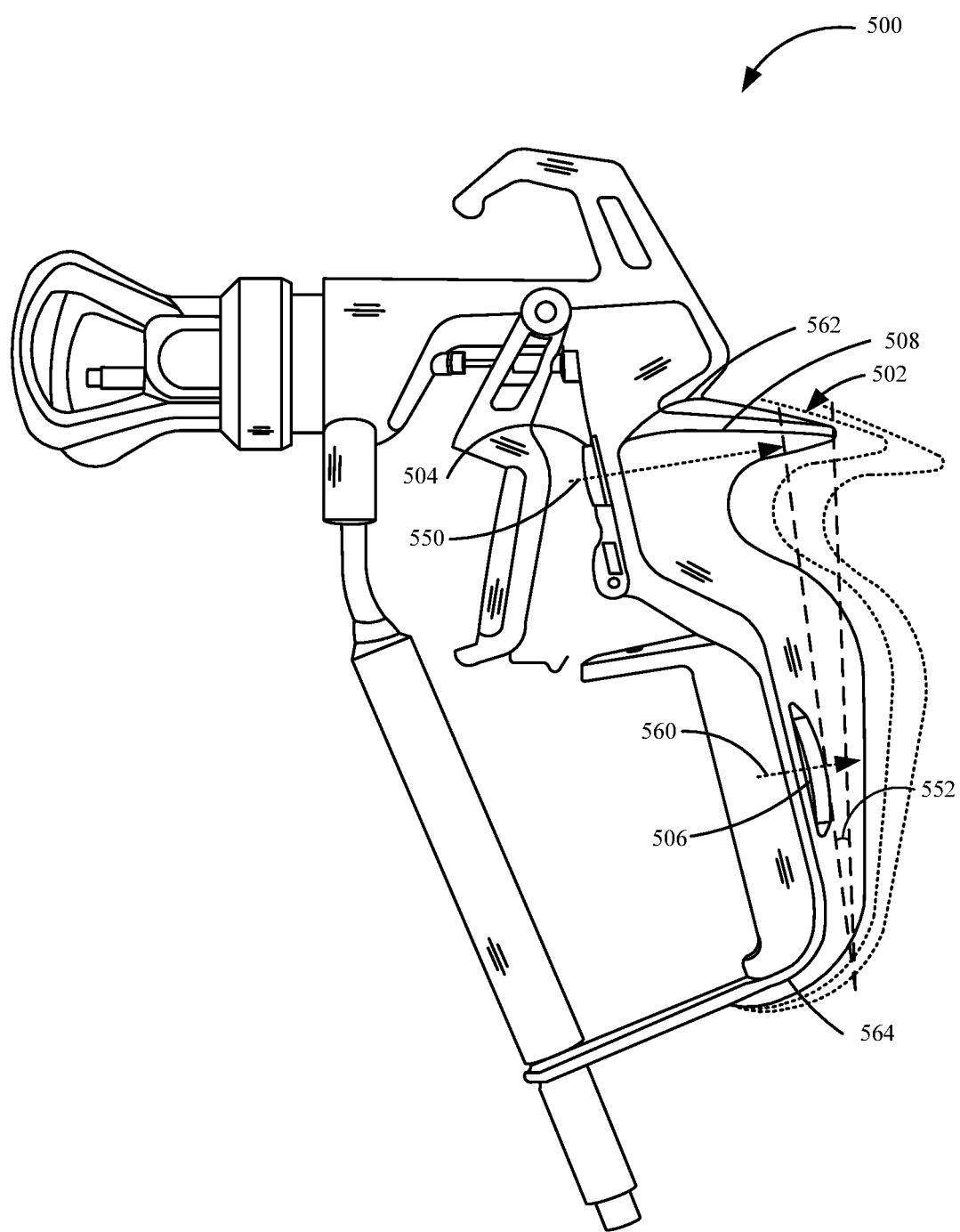

FIGS. 5A-5C illustrate a plurality of adjustment configurations of an adjustable handle in accordance with one embodiment of the present invention. In one embodiment, an applicator 500 comprises a handle 502, with a first adjustment mechanism 504 and a second adjustment mechanism 506. In one embodiment, adjustment mechanisms 504 and 506 operate independently, such that a user can adjust each independently. In another embodiment, adjustment mechanisms 504 and 506 are coupled, such that actuating one causes simultaneous adjustment of the other. In one embodiment, simultaneous actuation comprises one adjustment mechanisms actuating at a higher rate than the other.

FIG. 5A illustrates an adjustable handle 502 moving in the directions indicated by arrows 510 and 520. In one embodiment, a grip 508 of handle 502 remains parallel to a frame of applicator 500, as indicated in FIG. 5A. In one embodiment, when actuated, adjustment mechanisms 504 and 506 cause grip 508 to move in a non-parallel direction away from the frame of applicator 500, along arrows 530 and 540, as shown in FIG. 5B, such that a first end 542 of grip 508 is closer to frame than second end 544. In one embodiment, when actuated, adjustment mechanisms 504 and 506 cause grip 508 to move in a non-parallel direction away from the frame of applicator 500, along arrows 550 and 560, as shown in FIG. 5C, such that a first end 562 of grip 508 is closer to frame than second end 564.

Although the present invention has been described with reference to preferred embodiments, workers skilled in the art will recognize that changes may be made in form and detail without departing from the spirit and scope of the invention.

What is claimed is:

1. An applicator comprising:
   a fluidic channel for a fluid that extends from an inlet to an outlet; a trigger that, when actuated, allows the fluid to flow through the fluidic channel; and an adjustable handle comprising:
   a frame having a first side facing the trigger and a second side opposite the first side;
      a grip disposed on the second side of the frame; and
      a first user-rotatable adjustment mechanism coupling the grip to the frame and configured to, when rotated in a first direction, widen a first gap between the grip and the frame by applying a first force on the grip in a direction away from the frame, and, when rotated in a second direction decrease the first gap between the grip and frame by applying a second force on the grip in a direction toward the frame, wherein the first user-rotatable adjustment mechanism is configured to maintain the first gap between the grip and frame; and
      a second user-rotatable adjustment mechanism coupling the grip to the frame and configured to, when rotated in a first direction, widen a second gap between the grip and the frame, and, when rotated in a second direction, decrease the second gap between the grip and the frame.

2. The applicator of claim 1, wherein at least one of the first user-rotatable adjustment mechanism and the second user-rotatable adjustment mechanism comprises:
   a threaded portion having a first set of threads configured to rotationally engage with a corresponding second set of threads on one of the grip or the frame to apply force on the grip; and
   a user engageable portion that is coupled to and wider than the threaded portion and configured to rotate the threaded portion relative to the second set of threads.

3. The applicator of claim 1, wherein applying the first force on the grip increases a distance between the grip and the trigger.

4. The applicator of claim 1, wherein the first user-rotatable adjustment mechanism and the second user-rotatable adjustment mechanism are coupled such that rotation of one of the first user-rotatable adjustment mechanism and the second user-rotatable adjustment mechanism causes rotation of the other one of the first user-rotatable adjustment mechanism and the second user-rotatable adjustment mechanism .

5. The applicator of claim 1, wherein, when a grip force is applied on the grip towards the frame during user actuation of the trigger, the grip force being greater than the sum of a trigger force applied to actuate the trigger and a support force applied by a user on the handle to support the applicator.

6. The applicator of claim 1, wherein rotation of at least one of the first user-rotatable adjustment mechanism and the second user-rotatable adjustment mechanism increases a distance between a portion of the grip relative to the frame, such that an angle between the grip and frame changes.

7. The applicator of claim 6, wherein rotation of the at least one of the first user-rotatable adjustment mechanism and second user-rotatable adjustment mechanism in a first direction which increases the distance between the frame and the grip, and wherein rotation of the at least one of the first user-rotatable adjustment mechanism and second user-rotatable adjustment mechanism in a second direction decreases the distance between the frame and the grip.

8. The applicator of claim 2, wherein the at least one of the first user-rotatable adjustment mechanism and second user-rotatable adjustment mechanism comprises:
   a protrusion configured to fit within, and rotate with respect to, a corresponding socket formed in the grip.

9. A method for adjusting a handle of a spray applicator, the method comprising:
   positioning the handle of the spray applicator, the handle having a frame and a grip coupled to the frame; and
   actuating a first user-rotatable adjustment mechanism to cause a first moving force to be applied on a first portion of the grip in a direction away from the frame of the handle, such that a first perimeter around the handle, proximate the first user-rotatable adjustment mechanism, increases from a first distance to a second distance; and
   actuating a second user-rotatable adjustment mechanism to cause a second moving force to be applied on a second portion of the grip in a direction away from the frame of the handle, such that a second perimeter around the handle, proximate the second user-rotatable adjustment mechanism, increase from a third distance to a fourth distance.

10. The method of claim 9, wherein the grip is coupled to the frame, on a first side, that is opposite a second side of the frame that faces a trigger of the spray applicator.

11. The method of claim 10, wherein actuating at least one of the first user-rotatable adjustment mechanism and the second user-rotatable adjustment mechanism changes an angle between the frame and the grip.

12. The method of claim 9, and further comprising:
   locking at least one the first user-rotatable adjustment mechanism and second user-rotatable adjustment mechanism, such that at least one of the second distance and fourth distance is physically maintained under an applied grip force.

13. The method of claim 10, wherein at least one of the first user-rotatable adjustment mechanism and second user-rotatable adjustment mechanism comprises a threaded portion that is received by, and engages with, threads on the frame.

14. An adjustable handle for a fluid applicator, the adjustable handle comprising:
   a handle frame;
   a handle component;
   a first rotatable adjustment mechanism, movably coupling the handle component to the handle frame, wherein
      the first rotatable adjustment mechanism, when rotated in a first direction, widens a first gap between the handle component and the handle frame by applying a first force on the handle component in a direction away from the handle frame, and, when rotated in a second direction, decreases the gap between the handle component and the handle frame by applying a second force on the handle component in a direction toward the handle frame, and
      the first rotatable adjustment mechanism is configured to maintain the first gap between the component and handle frame; and
   a second rotatable adjustment mechanism coupling the handle component to the handle frame in a second location, wherein
      the second rotatable adjustment mechanism, when rotated in a first direction, widens a second gap between the handle component and the handle frame, and, when rotated in a second direction, decreases the second gap between the handle component and the handle frame.

15. The adjustable handle of claim 14, wherein the first rotatable adjustment mechanism extends through the handle frame, coupling the grip to a finger rest, wherein the finger rest is located on an opposite side of the handle frame from the grip.

16. The adjustable handle of claim 14, wherein at least one of the first rotatable adjustment mechanism and second rotatable adjustment mechanism comprises:
   a threaded screw that engages with, and is received by, internal threads within the handle frame; and a spherical protrusion configured to fit within, and rotate with respect to, a corresponding socket of the handle component.

* * * * *